United States Patent
Ma et al.

(10) Patent No.: US 9,503,934 B2
(45) Date of Patent: Nov. 22, 2016

(54) SYSTEM AND METHOD FOR RADIO ACCESS VIRTUALIZATION

(71) Applicant: Huawei Technologies Co., Ltd., Shenzhen (CN)

(72) Inventors: Jianglei Ma, Ottawa (CA); Wen Tong, Ottawa (CA); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 13/974,810

(22) Filed: Aug. 23, 2013

(65) Prior Publication Data

US 2014/0113643 A1    Apr. 24, 2014

Related U.S. Application Data

(60) Provisional application No. 61/715,702, filed on Oct. 18, 2012.

(51) Int. Cl.
*H04W 28/16* (2009.01)
*H04B 7/02* (2006.01)

(52) U.S. Cl.
CPC ............. *H04W 28/16* (2013.01); *H04B 7/024* (2013.01)

(58) Field of Classification Search
CPC .................................................. H04W 28/16
USPC ...................................................... 455/452.1
See application file for complete search history.

(56) References Cited

U.S. PATENT DOCUMENTS

| 8,396,153 B1* | 3/2013 | Shen et al. .................... 375/267 |
| 2007/0015514 A1 | 1/2007 | Bishop |
| 2011/0244900 A1 | 10/2011 | Noh et al. |
| 2011/0268006 A1 | 11/2011 | Koskela et al. |
| 2012/0157139 A1* | 6/2012 | Noh et al. ..................... 455/501 |
| 2013/0029591 A1* | 1/2013 | Park et al. ........................ 455/7 |
| 2013/0064213 A1* | 3/2013 | Park et al. ..................... 370/329 |
| 2013/0095821 A1* | 4/2013 | Lim et al. .................. 455/426.1 |
| 2013/0102342 A1* | 4/2013 | Tesanovic et al. ........... 455/507 |
| 2013/0157712 A1* | 6/2013 | Park et al. ..................... 455/525 |
| 2013/0235754 A1* | 9/2013 | Lim et al. ..................... 370/252 |
| 2013/0272170 A1* | 10/2013 | Chatterjee et al. ........... 370/280 |
| 2013/0286882 A1* | 10/2013 | Lim et al. ..................... 370/252 |

(Continued)

FOREIGN PATENT DOCUMENTS

DE      102004020651      11/2005
WO    WO 2011/149307 A2 *  12/2011

OTHER PUBLICATIONS

Notification of Transmittal of the International Search Report and the Written Opinion issued in International Application No. PCT/CN2013/085375, mailing date Jan. 16, 2014, 9 pages.

(Continued)

*Primary Examiner* — Nathan Mitchell
(74) *Attorney, Agent, or Firm* — Slater Matsil, LLP

(57) ABSTRACT

A method embodiment includes defining, by a network controller, one or more operation modes for a radio node in a network. The one or more operation modes includes a hyper transceiver mode, where the hyper transceiver mode configures a virtual transmission point to cooperatively communicate with a virtual reception point in accordance with neighborhood relations of a target radio node. The method further includes selecting one of the one or more operation modes for the radio node and signaling a selected operation mode to the radio node.

23 Claims, 5 Drawing Sheets

(56) References Cited

U.S. PATENT DOCUMENTS

2013/0288730 A1* 10/2013 Gomadam et al. ........... 455/509
2013/0308490 A1* 11/2013 Lim et al. .................... 370/252
2014/0293874 A1* 10/2014 Oh et al. ...................... 370/328

OTHER PUBLICATIONS

ITRI, "Performance Consideration of CoMP", Agenda item: 6.3.1.2, 3GPP TSG-RAN WG1 #63bis, R1-110543, Dublin, Ireland, Jan. 17-21, 2011, 2 pages.
Shihab Jimaa, et al., "LTE-A and Overview and Future Research Areas," Wireless and Mobile Computing, Networking and Communications (WIMOB), 2011 IEEE 7th International Conference on, IEEE, XP032000190, Oct. 10, 2011, pp. 395-399.
Balaji Raghothaman, et al., "System Architecture for a Cellular Network with Cooperative Mobile Relay," Vehicular Technology Conference (VTC Fall), IEEE, XP032029605, Sep. 5, 2011, pp. 1-5.
Communication—extended European search report, issued in European Application No. 13846354.2, mailing date Aug. 3, 2015, 9 pages.
Fang Wang, "An Efficient Retransmission Scheme for Data Sharing in D2D Assisted Cellular Networks," Mobile Congress (GMC), 2011 Global, IEEE, XP032073247, Oct. 17, 2011, pp. 1-6.
China Mobile Research Institute, XP-002704051 "C-RAN the Road Towards Green RAN," Internet Citation, XP-002704051, Apr. 2010, pp. 1-31.

* cited by examiner

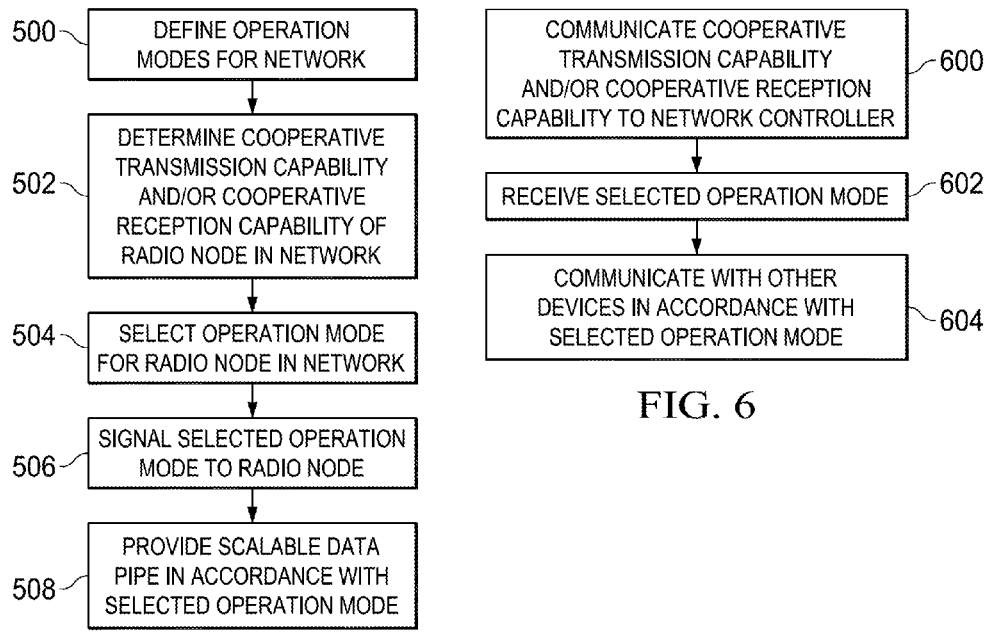
FIG. 5
FIG. 6
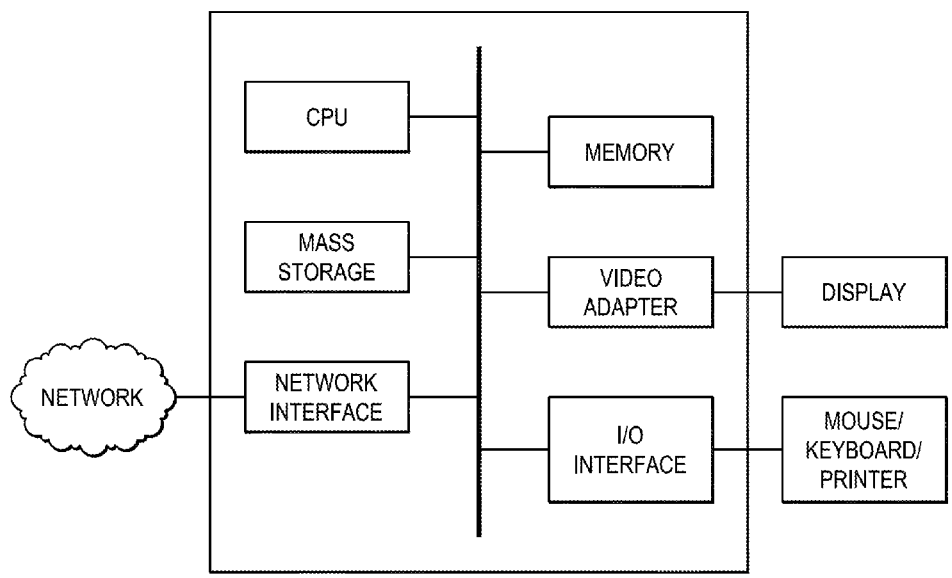
FIG. 7

SYSTEM AND METHOD FOR RADIO ACCESS VIRTUALIZATION

This application claims the benefit of U.S. Provisional Application No. 61/715,702, filed on Oct. 18, 2012, entitled "System and Method for Radio Access Virtualization," which application is hereby incorporated herein by reference.

TECHNICAL FIELD

The present invention relates generally to a system and method for wireless communications, and, in particular embodiments, to a system and method for radio access virtualization.

BACKGROUND

Generally, future wireless networks will be more interference dominant, with ultra-dense deployment of transmission points. Inter-cell interference will limit the performance of cell edge user equipment (UEs). Basically, traditional wireless network topology causes limited performance at cell edge UEs because of interference from adjacent cells or overlapping cells. The existing cell formation and UE-cell association mechanisms create many cell edge UEs. Technologies to manage or mitigate inter-cell interference have been investigated, such as inter-cell interference coordination (ICIC), coordinated multi-point (CoMP), and interference cancellation (IC). However, these technologies fail to address a fundamental problem of the existence of numerous cell edge UEs.

SUMMARY OF THE INVENTION

These and other problems are generally solved or circumvented, and technical advantages are generally achieved, by preferred embodiments of the present invention which provides a system and method for radio access virtualization.

In accordance with an embodiment, a method for radio access virtualization in a wireless network includes defining, by a network controller, one or more operation modes for a radio node in a network. The one or more operation modes includes a hyper transceiver mode, where the hyper transceiver mode configures a virtual transmission point to cooperatively communicate with a virtual reception point in accordance with neighborhood relations of a target radio node. The method further includes selecting one of the one or more operation modes for the radio node and signaling a selected operation mode to the first radio node.

In accordance with another embodiment, a network controller includes a processor, a computer readable storage medium storing programming for execution by the processor, and a transmitter for signaling a selected operation mode to a radio node in a network. The programming includes instructions define one or more operation modes for the network, and select one of the one or more operation modes for the radio node. The one or more operation modes include a hyper transceiver mode. The hyper transceiver mode configures a virtual transmission point to cooperatively communicate with a virtual reception point in accordance with neighborhood relations of a target radio node.

In accordance with another embodiment, a method for radio access virtualization in a wireless network includes receiving, by a first network device in a network, a selected operation mode and communicating with a second network device in the network in accordance with the selected operation mode. The selected operation mode is one of one or more operation modes. The one or more operation modes include a hyper transceiver mode. The hyper transceiver mode configures a virtual transmission point to cooperatively communicate with a virtual reception point in accordance with neighborhood relations of a target radio node.

In accordance with yet another embodiment, a network device includes a processor and a computer readable storage medium storing programming for execution by the processor. The programming includes instructions to signal a cooperative transmission capability or a cooperative reception capability of the network device, receive a selected operation mode, and communicate with a second network device in accordance with the selected operation mode. The selected operation mode is one of one or more operation modes. The one or more operation modes include a hyper transceiver mode. The hyper transceiver mode configures a virtual transmission point to cooperative communicate with a virtual reception point in accordance with neighborhood relations of a target radio node.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is a flow chart of network controller operations in accordance with various embodiments;

FIG. 6 is a flow chart of network device operations in accordance with various embodiments; and FIG. 7 is a block diagram of a computing system, which may be used to implement various embodiments.

DETAILED DESCRIPTION OF ILLUSTRATIVE EMBODIMENTS

Figure 1:
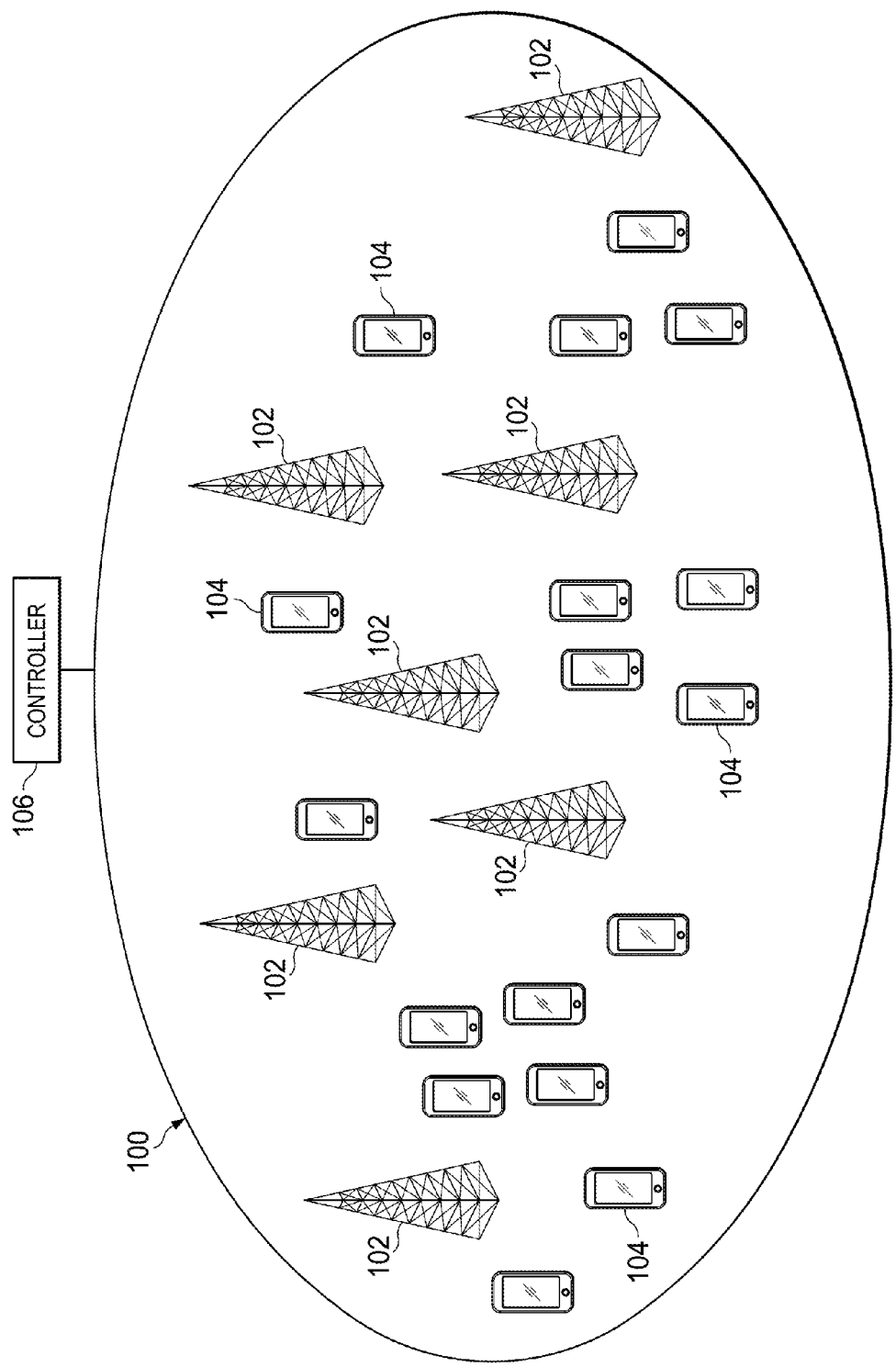
FIG. 1 is a block diagram of a network, which may operate in accordance with various embodiments.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely a cloud radio access network (CRAN). Various embodiments may also be applied, however, to other networks where a group of network transmission points may be controlled by one or more controllers. Various embodiments may be implemented in long term evolution (LTE) access networks (e.g., 4G, future 5G, and beyond) and in LTE devices (e.g., base stations (BSs) and user equipment (UEs)) and future advanced devices.

Generally, current networking technologies for handling inter-cell interference consider transmitters and receivers separately. For example, one or more transmitting nodes (e.g., BSs) may jointly transmit information to receiving nodes (e.g., UEs) in its coverage area. As another example, one or more receiving nodes (e.g., UEs) may jointly receive information from an associated transmitting node (e.g., a BS). However, such schemes still rely on network associations between specific BSs and UEs in specific coverage areas.

Various embodiments provide a network controller, which defines various operation modes for transmitting data in a network. At least one of these operation modes may be a hyper transceiver mode, where both the transmitter and the receiver are virtualized in accordance with neighborhood relations of a target radio node (e.g., a target UE). That is, a virtual transmission point and a virtual reception point allow for joint transmission and joint reception to a target radio node. The virtual transmission point and virtual reception point are formed of a subset of radio nodes in the network based on neighborhood relations of the target radio node in order to reduce the complexity of joint transmission and joint reception to a manageable level.

In a hyper transceiver operation mode, data transmissions no longer rely on the traditional BS and UE association mechanism. Thus, the presence of cell edges or cell boundaries is minimized or eliminated, and the issue of inter-cell interference is addressed on a fundamental level. Hyper transceivers may be employed to provide a scalable data pipe to radio nodes for data transmission. The configuration of the data pipe may be defined by channel resource allocations and the formation of a virtual transmission point and a virtual reception point. The data throughput level of the scalable data pipe may be dynamically configured to meet different quality of service (QoS) requirements of different services (e.g., different subscription levels) for a target radio node (e.g., a target UE). A centralized controller may be used to optimally group the various hyper transceivers and to schedule transmissions.

FIG. 1 illustrates a block diagram of a network 100, which may operate in accordance with various embodiments. Network 100 may be a CRAN. Network 100 uses CRAN architecture to virtualize transmission points using cloud computing, multi-core processor, fiber connectivity, and intelligent radio systems technologies. Network 100 may further use device-to-device (D2D) communications and/or backhaul link communications to provide virtual reception points.

Network 100 includes a plurality of radio nodes, such as BSs 102 and UEs 104. Communications between BSs 102 and UEs 104 may be managed by a centralized network controller 106, which may define various modes of operation for communications and select a particular mode of operation for each radio node (e.g., BSs 102 and UEs 104). Notably, controller 106 may be a separate entity or co-located in other entities (e.g., in a BS 102).

FIG. 1 illustrates a single controller 106 managing network 100 for simplicity. However, network 100 may be partitioned into a plurality of clusters (e.g., CRAN clusters) to manage controller deployment complexity. When network 100 is partitioned into a plurality of clusters, controller 106 may only manage one or a subset of clusters in network 100 depending on the size and complexity of the clusters. Other controllers 106 may manage the remaining CRAN clusters in network 100. Furthermore, controllers 106 may coordinate management of clusters in network 100 to avoid interference and cell-edge type boundaries between coverage areas. For example, a radio node at a cluster boundary between two controllers 106 may be managed by both controllers 106 jointly. As another example, controllers 106 may be managed by one or more higher-tier controllers. Radio nodes at a cluster boundary may be managed by an applicable higher-tier controller. Of course, further tiers of higher cluster control, such as a global cluster controller, may also be used to manage network 100 depending on network complexity and configuration.

Data transmissions in network 100 may be done using scalable data pipes provided by controller 106. Generally, a scalable data pipe is provided by dynamically configuring its size (e.g., its data throughput level) and selecting a transmitting node for a transmission. Rather than assigning a plurality of resource blocks of a particular integer size for a transmission, controller 106 may dynamically configure the throughput of a scalable data pipe to meet a quality of service (QoS) requirement for different services of the radio node. For example, controller 106 may configure a data pipe with a high throughput for a UE to receive large data (e.g., a streaming movie), whereas a low throughput may be configured for a UE to receive small data (e.g., small packet transmissions). The data pipe size may also be determined by the selection of a communications operation mode. For example, when a data packet is transmitted by more than one transmitting node and/or received by more than one receiving node, the assigned channel resources may be less than the channel resources that would have been assigned in a normal operation mode (i.e., a single transmitting node transmitting to a single receiving node). Furthermore, controller 106 may select a transmission point for the data pipe in accordance with a selected operation mode for a target receiving node.

Controller 106 defines various operation modes for communications between radio nodes (e.g., BSs 102 and UEs 104). The various operation modes include a hyper transceiver mode. The various operation modes may also include a normal transmission mode, a hyper transmission mode, a hyper reception mode, or combinations thereof. As explained in greater detail below, multiple cooperative transmitting nodes transmit data to multiple cooperative reception modes in a hyper transceiver mode. A normal transmission mode is a standard/legacy operation mode where a single transmitting node (e.g., BS 102) communications with a single receiving node (e.g., UE 104) using any suitable framework, which may include interference cancelling techniques or other interference management schemes. Selecting a particular BS 102 for transmissions to target UE 104 may be done by controller 106 in accordance with the target UE 104's neighborhood relations (e.g., the target UE's physical location in relation to available BSs in network 100, radio signal path loss statistics, received signal strength, or the like).

A hyper transmission mode is generally an operation mode where cooperating transmitting nodes (e.g., multiple BSs) communicate with a single receiving node (e.g., a UE). In a hyper transmission mode, various receiving nodes (e.g., UEs 104) may not perform cooperative reception of data.

Figure 2:
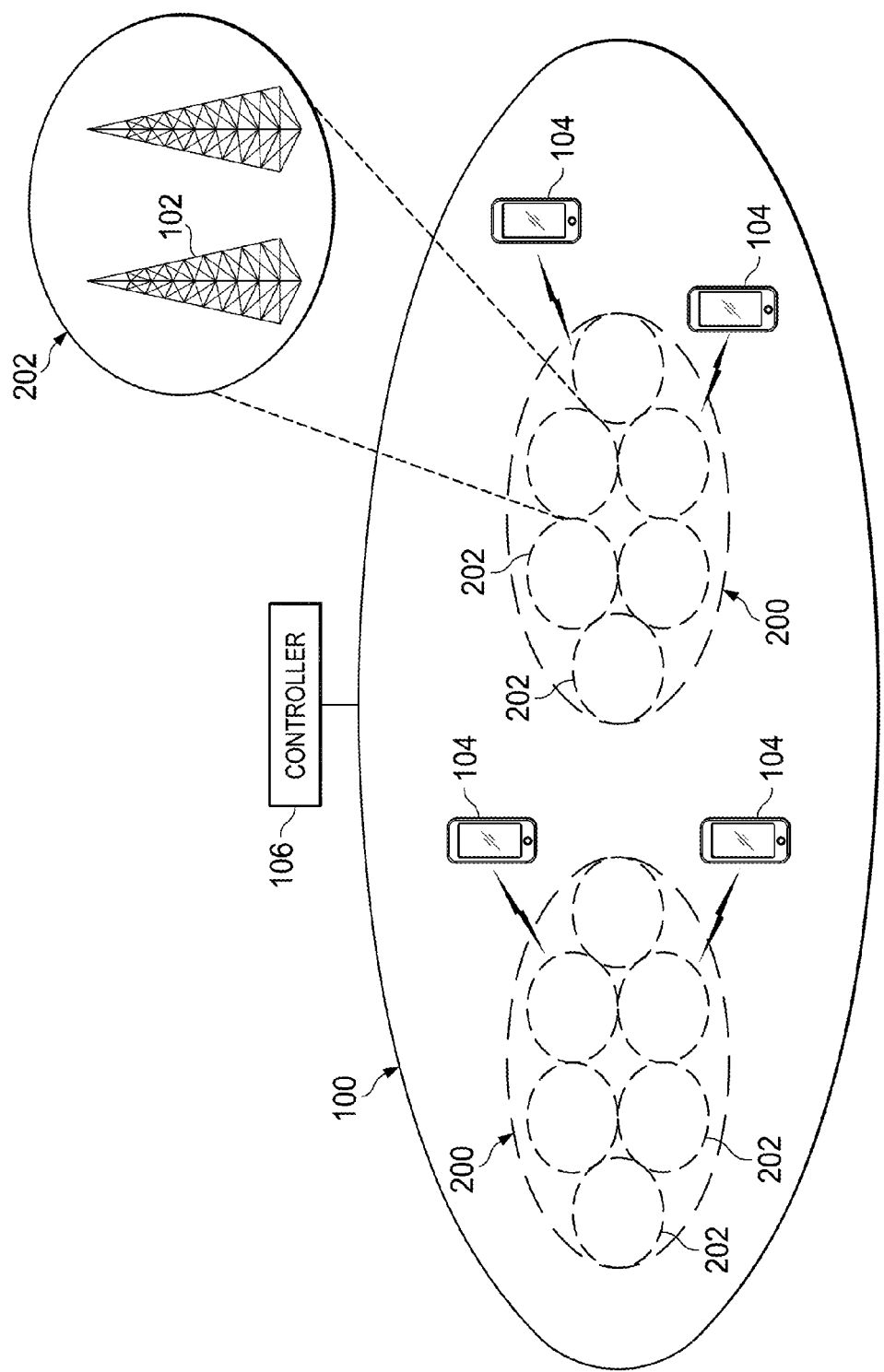
FIG. 2 is a block diagram of a network operating in a hyper transmission mode in accordance with various embodiments.

FIG. 2 illustrates network 100 operating in a hyper transmission mode in accordance with various embodiments. In order to simplify the highly complex nature of joint transmissions involving all available transmitting nodes in a network, transmitting nodes in network 100 may be partitioned into CRAN clusters 200. In FIG. 2, CRAN clusters 200 are illustrated as being managed by a single controller 106. Alternatively CRAN clusters 200 may be controlled by separate controllers 106 (e.g., when CRAN clusters 200 are large or require greater signal processing management capabilities than a single controller 106 can provide). Each CRAN cluster 200 may further be subdivided into virtual transmission points 202 (also referred to as CRAN sub-clusters 202). Each virtual transmission point 202 may include a plurality of transmitting nodes (e.g., BSs 102) cooperatively transmitting data to receiving nodes (e.g., UEs 104). Cooperative transmissions by transmitting nodes in a virtual transmission point 202 may be coordinated using, e.g., a backhaul communication link. The number of BSs in each virtual transmission points 202 may vary depending on network configuration.

CRAN clusters 200 and virtual transmission points 202 are dynamically grouped to provide coordinated transmissions to receiving nodes (e.g., UEs 104) in accordance with neighborhood relations between available transmission points and a target receiving node (e.g., radio signal path loss statistics, received signal strength, geography, or the like). Specifically, this dynamic grouping may be performed by controller 106 to avoid the formation of cell-edge receiving nodes. For example, a scheme for grouping CRAN clusters 200 and virtual transmission points 202 is described in U.S. patent application Ser. No. 13/932,761, filed on Jul. 1, 2013, entitled "System and Method for Grouping and Selecting Transmission Points," which application is hereby incorporated herein by reference.

A hyper reception mode is generally an operation mode where a single transmitting node (e.g., a BS) communicates with multiple cooperative receiving nodes (e.g., multiple UE). In a hyper reception mode, various transmitting nodes (e.g., BSs) may not perform cooperative transmission of data.

Figure 3:
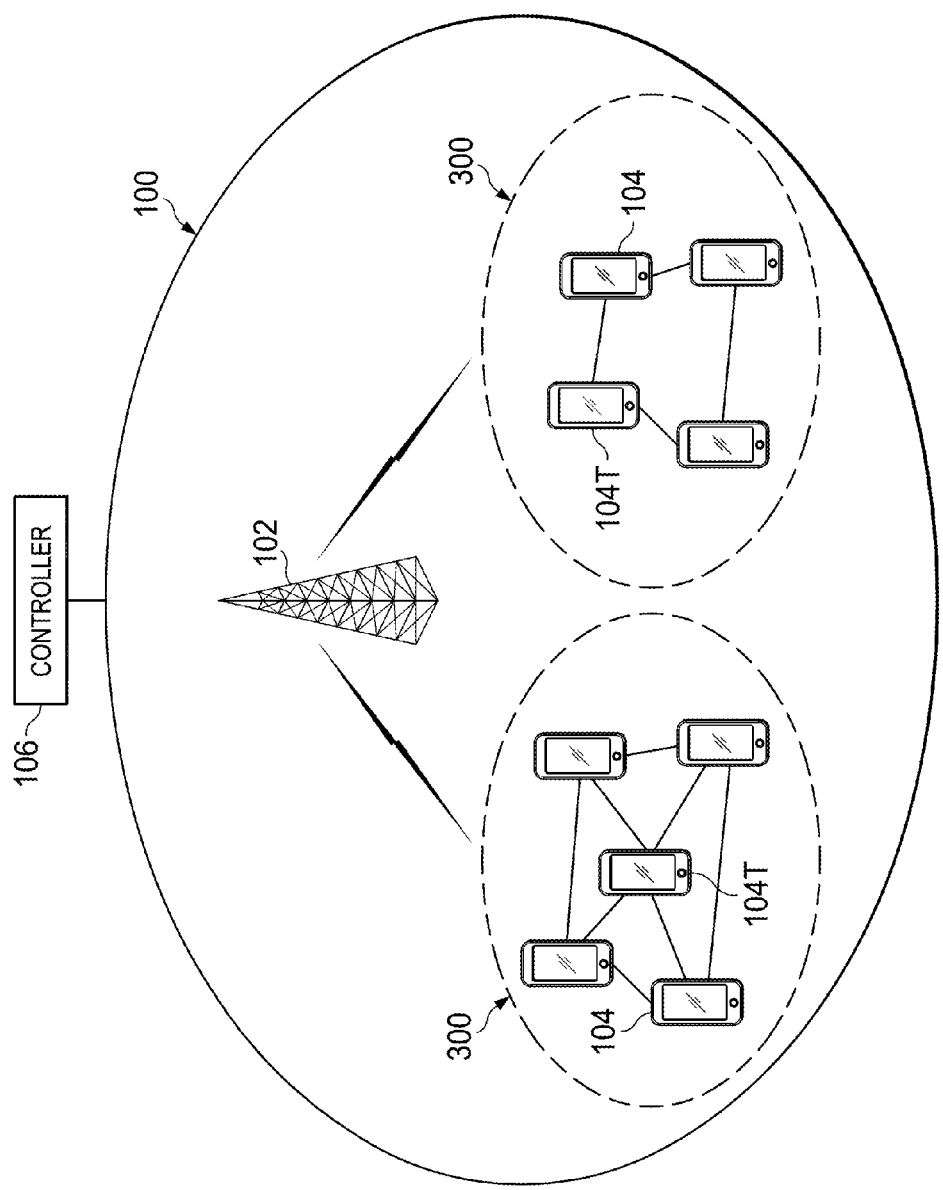
FIG. 3 is a block diagram of a network operating in a hyper reception mode in accordance with various embodiments.

FIG. 3 illustrates network 100 operating in a hyper reception mode in accordance with various embodiments. FIG. 3 illustrates a BS 102 communicating with two virtual reception points 300. Each virtual reception point 300 includes a plurality of receiving nodes (e.g., UEs 104) cooperatively receiving and decoding transmissions. UEs 104 may cooperatively receive transmissions by communicating with other UEs 104 in a virtual reception point 300 using, for example, D2D communications. While FIG. 3 illustrates virtual reception points 300 having four or five receiving nodes, the number of receiving nodes in a virtual reception point may vary, for example, depending on the availability of cooperative reception capable receivers, available resources of nearby receivers, and the like.

Virtual reception points 300 are formed by cooperation between receiving nodes, which provides many benefits such as diversity in space, time, and frequency, improving system capacity and coverage. Receiving node cooperation increases robustness against fading and interference and decreases the overall number of network radio sites. Receiving node cooperation further minimizes operating and maintenance costs while still maintaining a desired QoS level.

Generally, transmissions from BS 102 over certain channel resources may be targeted towards a particular target receiving node 104T in a virtual reception point 300. The remaining receiving nodes in each virtual reception point 300 may be referred to as helper receivers and improve the quality of reception of the target receiving node. For example, a helper receiver may have a better transmission channel established with BS 102 than a target receiver 104T. Thus, the helper receiver may receiver a portion of or all of a transmission meant for target receiver 104T. The helper receiver may then forward the received transmission to the target receiver 104T using, for example, D2D communications. A more detailed description of communications using virtual reception points is disclosed in U.S. patent application Ser. No. 13/646,549, filed on Oct. 5, 2012, entitled "Terminal Based Grouping Virtual Transmission and Reception in Wireless Networks," which application is hereby incorporated herein by reference.

A hyper transceiver mode is generally an operation mode where multiple transmitting nodes (e.g., multiple BSs) cooperatively communicate with multiple receiving nodes (e.g., multiple UEs). In a hyper transceiver node, a virtual transmission point communicates with a virtual reception point to transmit data.

Figure 4:
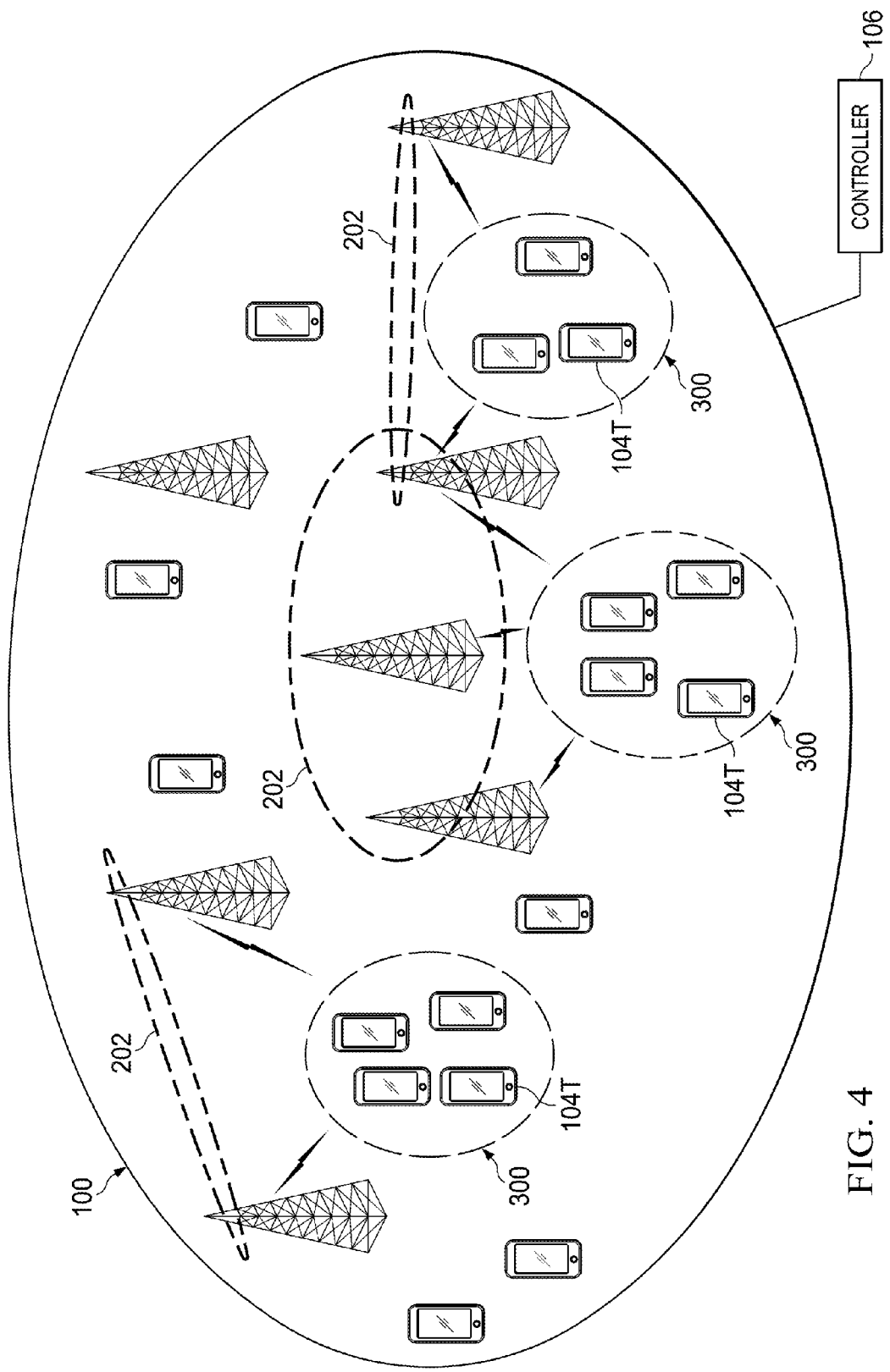
FIG. 4 is a block diagram of a network operating in a hyper transceiver mode in accordance with various embodiments.

FIG. 4 illustrates network 100 operating in a hyper transceiver mode in accordance with various embodiments. In a hyper transceiver mode, virtual transmission points 202 communicate with virtual reception points 300 using scalable data pipes. Data packets are jointly cooperatively transmitted by transmitting nodes (e.g., BSs 102) in virtual transmission points 202. Transmissions meant for a target receiver 104T are jointly or cooperatively received by cooperating receiving nodes in the applicable virtual reception point 300.

The grouping of transmitting nodes and receiving nodes into virtual transmission points and virtual reception points, respectively, may be performed by controller 106 based on the neighborhood relations of a target receiver 104T. The neighborhood relations of a target receiver 104T generally refers to target receiver 104T's relative channel quality (e.g., radio signal path loss statistics, received signal strength, geography, or the like) in relation to other available receiving nodes and transmitting nodes capable of cooperative transmissions/reception in network 100. For example, controller 106 may form a virtual transmission point 202 by selecting optimal, cooperative transmission capable transmitting nodes based on the target radio node 104's relative position and received signal strength so that the target radio node 104T is not in a cell edge/boundary. Controller 106 may also form a virtual reception point 300 based on available cooperative receiving nodes in the proximity of the target radio node 104T.

Furthermore, as a target receiver 104T's physical location changes, the virtual transmission point and virtual reception point corresponding to that target receiver 104T may be dynamically reconfigured by controller 106 in accordance with the target receiver 104T's new neighborhood relations. Thus, the grouping of transmitting nodes and receiving nodes into virtual transmission points 202 and virtual reception points 300, respectively, may be target receiving node centric. That is, the grouping may depend on the neighborhood relations of a target receiving node in network 100. The particular configurations of virtual transmission points 202 and virtual reception points 300 in FIG. 4 are merely examples of possible configurations, other configurations are also contemplated in various embodiments.

Controller 106 selects an operation mode for each radio node in network 100. The selected operation mode may or may not vary among different radio nodes in network 100. For example, different radio nodes in network 100 may simultaneously operate in a normal transmission mode, a hyper transmission mode, a hyper reception mode, a hyper transceiver mode, and combinations thereof. Controller 106 signals a selected operation mode to each radio node in network 100, and the radio nodes communicate within network 100 in accordance with their selected operation mode. Controller 106 may also provide scalable data pipes to radio nodes for transmissions in accordance with the selected transmission mode and other considerations (e.g., a QoS requirement).

The selection of an operation mode for a radio node may be performed by controller 106 in accordance with service requirements, QoS requirements for a particular service, network load, transmitting node capability, receiving node capability, application, traffic type, energy efficiency, or the like. The capability of a radio node to conduct cooperative transmission and/or cooperative reception of data is a factor in selecting an operation mode for a radio node. Controller 106 is aware of a cooperative transmission capability and a cooperative reception capability for each radio node in network 100. For example, a receiving radio node may signal to controller 106 its cooperative reception capability. A receiving node's cooperative reception capability may depend on its ability to conduct D2D communications. A transmitting radio node may signal its cooperative transmission capability to controller 106. If the radio node is not capable of cooperative transmissions and/or cooperative reception, controller 106 may select an appropriate operation mode accordingly and may semi-statically signal the selected operation mode to the radio node.

In various embodiments, operation mode selection may also take into account other considerations such as service requirements, QoS requirements for a transmission (e.g., a data packet), network load, energy efficiency, and the like. For example, controller 106 may not expend network resources on cooperative transmissions/reception for low service requirement or low QoS transmissions. As another example, if the channel quality between a receiving node and a transmitting node is good, cooperative transmission and reception may be unnecessary. Thus, controller 106 may conserve network resources by selecting a normal transmission mode for radio nodes having good existing channel quality. As another example, if the network load of network 100 is light (e.g., there is an ample amount of network resources for all scheduled transmissions), controller 106 may determine cooperative transmissions/reception are unnecessary. Controller 106 may select a normal transmission mode for transmissions, simplifying computational cost (e.g., reducing the cost of decoding joint transmissions). As yet another example, network 100 may disable some transmission points to conserve energy, and thus cooperative transmission capabilities may not be enabled. Similarly, cooperative reception may be disabled at receiving nodes to conserve energy. Controller 106 may select an operation mode in accordance with the enabled hyper transmission/reception capabilities. In these embodiments when controller 106 takes into account other considerations, such as, service requirements, QoS requirements, network load, energy efficiency, and the like in selecting an operation mode, controller 106 may dynamically signal the selected operation mode to the radio node in accordance with any changes in network 100 and/or the transmission.

FIG. 5 illustrates a flow chart of network controller operation in accordance with various embodiments. In step 500, a network controller defines one or more operation modes for transmissions in the network. The operation modes at least include a hyper transceiver mode, where virtual transmission points cooperatively communicate with virtual reception points in accordance with neighborhood relations of a target radio node. The operation modes may further include a normal transmission mode, a hyper transmission mode, a hyper reception mode, or a combination thereof. A normal transmission mode is defined as an operation mode where a single transmitting node communicates with a single receiving node. A hyper transmission mode is defined as an operation mode where multiple transmitting nodes cooperative communicate with a single receiving node. A hyper reception mode is defined as an operation mode where a single transmitting node communicates with multiple cooperative receiving nodes.

In step 502, the network controller may obtain the information on a cooperative transmission capability and/or cooperative reception capability of a radio node in the network. For example, the radio node may signal, to the network controller, its cooperative reception capability based on its ability to conduct D2D communications, its ability coordinate transmissions with other transmitting nodes using a backhaul link, or the like. In step 504, the network controller selects an operation mode for the radio node. The selection of an operation mode may be in accordance with the radio node's cooperative transmission capability (e.g., when the radio node is a transmitting node) or its cooperative reception capability (e.g., when the radio node is a receiving node). The selection of an operation mode may also take into consideration other factors such as service requirements, QoS requirements, network load, and the like. In step 506, the network controller signals the selected operation mode to the radio node.

In step 508, the network controller may provide a scalable data pipe to radio nodes for transmissions. The scalable data pipe may be configured in accordance with the selected operation mode (i.e., the transmitting/receiving points may be selected in accordance with the selected operation mode). A throughput of the data pipe may be dynamically configured in accordance with a QoS requirement of a service for a radio node.

FIG. 6 is a flow diagram of network device operations in accordance with various embodiments. In step 600, the network device signals its cooperative transmission capability and cooperative reception capability to a network controller. The network device's cooperative reception capability may depend on its ability to conduct D2D communications (e.g., when the device is a UE) or its ability to communicate over a backhaul link (e.g., when the device is a BS). The network device's cooperative transmission capability may depend on its ability to cooperative transmit data by communicating with other transmitting nodes over a backhaul link (e.g., when the device is a BS) or D2D communications (e.g., when the device is a UE). In step 602, the network device receives a selected operation mode. The selected operation mode is one of several defined for a network by the network controller. The defined operation modes at least include a hyper transceiver mode, where virtual transmission points cooperatively transmit data to virtual reception points in accordance with neighborhood relations of a target radio node. The selected operation mode may be done in accordance with a cooperative transmission capability of the network device (e.g., when the network device is a transmitting node) or a cooperative reception capability of the network device (e.g., when the network device is a receiving node). In step 604, the network device transmits/receives data in accordance with the selected operation mode using, for example, a scalable data pipe provided by the controller in accordance with the selected operation mode.

FIG. 7 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for radio access virtualization in a network, the method comprising:
    defining, by a network controller, one or more operation modes for a first radio node in the network, wherein the one or more operation modes includes a hyper transceiver mode, wherein the hyper transceiver mode configures a virtual transmission point comprising the first radio node and at least one other radio node jointly performing both transmit and receive communications, to cooperatively communicate with a virtual reception point comprising a target radio node and at least one neighboring radio node jointly performing both transmit and receive communications, in accordance with neighborhood relations of the target radio node;
    selecting, by the network controller, one of the one or more operation modes for the first radio node; and
    signaling, by the network controller, a selected operation mode to the first radio node.

2. The method of claim 1, wherein the one or more operation modes further includes a normal transceiver mode, a hyper transmission mode, a hyper reception mode, or a combination thereof.

3. The method of claim 1, wherein selecting one of the one or more operation modes comprises selecting one of the one or more operation modes in accordance with a cooperative transmission capability of the first radio node, the method further comprising:
    determining the cooperative transmission capability of the first radio node.

4. The method of claim 1, wherein selecting one of the one or more operation modes comprises selecting one of the one or more operation modes in accordance with a service requirement of a transmission, a quality of service (QoS) requirement for a type of service for the first radio node, a network load of the network, energy efficiency of the network, or a combination thereof, and wherein signaling the selected operation mode comprises dynamically signaling the selected operation mode to the first radio node.

5. The method of claim 1, wherein selecting one of the one or more operation modes further comprises selecting one of the one or more operation modes in accordance with a cooperative reception capability of a second radio node, wherein the virtual reception point comprises the second radio node, and wherein the method further comprises selecting, by the network controller, one of the one or more operation modes for the second radio node.

6. The method of claim 1, further comprising providing a scalable data pipe to the first radio node for communications in accordance with the selected operation mode.

7. The method of claim 6, further comprising dynamically allocating, by the network controller, a data throughput level for the scalable data pipe in accordance with a quality of service (QoS) for a type of service for the first radio node.

8. The method of claim 1, wherein the network is a cloud radio access network (CRAN), and wherein the hyper transceiver mode utilizes device-to-device (D2D) communications.

9. A network controller comprising:
    a processor;
    a computer readable storage medium storing programming for execution by the processor, the programming including instructions to:
        define one or more operation modes for a first radio node in a network, wherein the one or more operation modes includes a hyper transceiver mode, wherein the hyper transceiver mode configures a virtual transmission point, comprising at least two radio nodes jointly performing both transmit and receive communications, to cooperatively communicate with a virtual reception point comprising the first radio node and a target radio node jointly performing both transmit and receive communications, in accordance with neighborhood relations of the target radio node; and
        select one of the one or more operation modes for the first radio node in the network; and
    a transmitter for signaling a selected operation mode to the first radio node.

10. The network controller of claim 9, wherein the network is a cloud radio access network (CRAN) and the hyper transceiver mode utilizes device-to-device (D2D) communications.

11. The network controller of claim 9, wherein the one or more operation modes further include a normal transceiver mode, a hyper transmission mode, a hyper reception mode, or a combination thereof.

12. The network controller of claim 9, wherein the programming includes further instructions to provide a scalable data pipe to the first radio node in accordance with the selected operation mode, wherein a data throughput level for the scalable data pipe is dynamically configured, by the network controller, in accordance with a quality of service (QoS) requirement for a type of service for the first radio node.

13. The network controller of claim 9, wherein the programming includes further instructions to determine a cooperative transmission capability of a second radio node, wherein the virtual transmission point comprises the second radio node, and wherein the instructions to select one of the one or more operation modes includes further instructions to select one of the one or more operation modes in accordance with the cooperative transmission capability of the second radio node.

14. The network controller of claim 9, wherein the programming includes further instructions to determine a cooperative reception capability of the first radio node, and wherein the instructions to select one of the one or more operation modes includes further instructions to select one of the one or more operation modes in accordance with the cooperative reception capability of the first radio node.

15. A method for radio access virtualization in a network, the method comprising:
receiving, by a first network device in the network, a selected operation mode from a network controller, wherein the selected operation mode is one of one or more operation modes selected by the network controller for the first network device, wherein the one or more operation modes includes a hyper transceiver mode, and wherein the hyper transceiver mode configures a virtual transmission point comprising the first network device node and at least one other network device jointly performing both transmit and receive communications, to cooperatively communicate with a virtual reception point comprising a target radio node and at least one second network device jointly performing both transmit and receive communications, in accordance with neighborhood relations of the target radio node; and
communicating with the second network device in the network in accordance with the selected operation mode.

16. The method of claim 15, further comprising signaling, to the network, a cooperative transmission capability or a cooperative reception capability of the first network device, wherein the selected operation mode is selected in accordance with the cooperative transmission capability or the cooperative reception capability.

17. The method of claim 16, wherein the cooperative reception capability is in accordance with a device-to-device (D2D) communication capability of the first network device.

18. The method of claim 15, wherein the one or more operation modes further includes a normal transceiver mode, a hyper transmission mode, a hyper reception mode, or a combination thereof.

19. The method of claim 15, wherein the network is a cloud access radio network (CARN).

20. The method of claim 15, wherein communicating with the second network device comprises using a scalable data pipe in accordance with the selected operation mode.

21. The method of claim 20, wherein a data throughput level of the scalable data pipe is dynamically configured in accordance with a quality of service (QoS) requirement for a type of service for the first network device.

22. A network device comprising:
a processor;
a computer readable storage medium storing programming for execution by the processor, the programming including instructions to:
signal a cooperative transmission capability or a cooperative reception capability of the network device to a network;
receive a selected operation mode from a network controller, wherein the selected operation mode is one of one or more operation modes selected by the network controller for the network device, wherein the one or more operation modes includes a hyper transceiver mode, and wherein the hyper transceiver mode configures a virtual transmission point, comprising a second network device and at least one other radio node jointly performing both transmit and receive communications, to cooperatively communicate with a virtual reception point comprising the network device and a target radio node jointly performing both transmit and receive communications, in accordance with neighborhood relations of the target radio node; and
communicate with the second network device in the network in accordance with the selected operation mode.

23. The network device of claim 22, wherein the selected operation mode is selected in accordance with the cooperative transmission capability or the cooperative reception capability.

* * * * *